United States Patent [19]
Chang

[11] Patent Number: 6,129,588
[45] Date of Patent: Oct. 10, 2000

[54] SMART CARD CONNECTOR HAVING OPENINGS FOR EXPOSING SIGNAL TERMINALS OF THE CONNECTOR AND ACCOMMODATING OTHER ELECTRONIC ELEMENTS

[75] Inventor: Yao-Hao Chang, Tu-Chen, Taiwan

[73] Assignee: Foxconn International, Inc., Taipei Hsien, Taiwan

[21] Appl. No.: 09/328,167

[22] Filed: Jun. 8, 1999

[30] Foreign Application Priority Data

Sep. 4, 1998 [TW] Taiwan .................................. 87214665

[51] Int. Cl.[7] .................................................. H01R 24/00
[52] U.S. Cl. ............................................................ 439/630
[58] Field of Search ..................... 439/630, 620, 439/607

[56] References Cited

U.S. PATENT DOCUMENTS

| | | | |
|---|---|---|---|
| 5,823,828 | 10/1998 | Bricaud et al. | 439/630 |
| 5,984,727 | 11/1999 | Wu et al. | 439/607 |
| 6,022,239 | 2/2000 | Wright | 439/607 |

*Primary Examiner*—Neil Abrams
*Assistant Examiner*—Javaid Nasri
*Attorney, Agent, or Firm*—Wei Te Chung

[57] ABSTRACT

A smart card connector comprises an insulative housing, a number of signal terminals, a pair of switching terminals and a metal shell covering an upper surface of the housing thereby defining a space therebetween for receiving an inserted smart card. The housing defines a number of terminal receiving slots for receiving the corresponding signal terminals. The metal shell comprises a planar portion and a pair of side walls. A pair of spring arms and a number of hooks are stamped in the side walls of the metal shell. The hooks are adapted to secure the metal shell to the housing. The spring arms of the metal shell are adapted to inwardly press against the inserted smart card thereby preventing transverse movement of the smart card. The metal shell defines a pair of holes for exposing the terminals thereby preventing the terminals from touching the metal shell.

6 Claims, 4 Drawing Sheets

SMART CARD CONNECTOR HAVING OPENINGS FOR EXPOSING SIGNAL TERMINALS OF THE CONNECTOR AND ACCOMMODATING OTHER ELECTRONIC ELEMENTS

BACKGROUND OF THE INVENTION

The present invention generally relates to a smart card connector, and particularly to a low profile smart card connector having a metal shell which can prevent deformation of an inserted smart card.

Portable data processors such as mobile phones, portable computers and digital cameras are commonly used in public. However, the compact dimensions of such processors limit the amount of data capable of being stored therein. Thus, a smart card connector for providing electrical connection between a processor and a smart card is required to expand the memory and functional ability of the processor.

The related prior art is disclosed in U.S. Pat. Nos. 5,013, 255 and 5,653,610. When a smart card is inserted into the smart card connector, upwardly flexing terminals mounted therein press against the smart card thereby deforming the smart card. In addition, a smart card received in the smart card connector is likely to move transversely whereby unstable signals are generated. A top cover of the smart card connector is usually manufactured by injection molding. To maintain a desirable strength, the top cover must have a large thickness thereby increasing an overall height of the smart card connector. Furthermore, the plastic top cover cannot provide an electromagnetic shielding effectiveness to the connector. Finally, since the cover totally covers an upper side of the connector, an access to an inside of the connector to proceed a repair of an electrical component mounted on a circuit board within the connector cannot be done without removing the cover from the connector.

SUMMARY OF THE INVENTION

Accordingly, the first purpose of the present invention is to provide a lowprofile smart card connector.

The second purpose of the present invention is to provide a smart card connector which prevents deformation of an inserted smart card.

The third purpose of the present invention is to provide a smart card connector having a structure which promotes an efficient use of circuit board space and provides easy access to electrical components mounted on the circuit board within the smart card connector.

To fulfill the above-mentioned purposes, a smart card connector in accordance with the present invention comprises an insulative housing, a plurality of signal terminals, a pair of switching terminals and a metal shell covering an upper surface of the housing thereby defining a space therebetween for receiving an inserted smart card. The housing defines a plurality of slots for receiving the corresponding signal terminals. The metal shell comprises a planar portion and a pair of side walls downwardly extending from opposite edges thereof. A pair of inwardly extending spring arms and a plurality of inwardly flexing hooks are stamped in the side walls of the metal shell. The hooks of the metal shell are adapted to secure the metal shell to the housing. The spring arms of the metal shell are adapted to inwardly press against the inserted smart card thereby preventing the transverse movement of the smart card. The metal shell defines a pair of holes for exposing the terminals. Thus, the terminals do not touch the metal shell.

DETAILED DESCRIPTION OF THE PREFERRED EMBODIMENT

Figure 1:
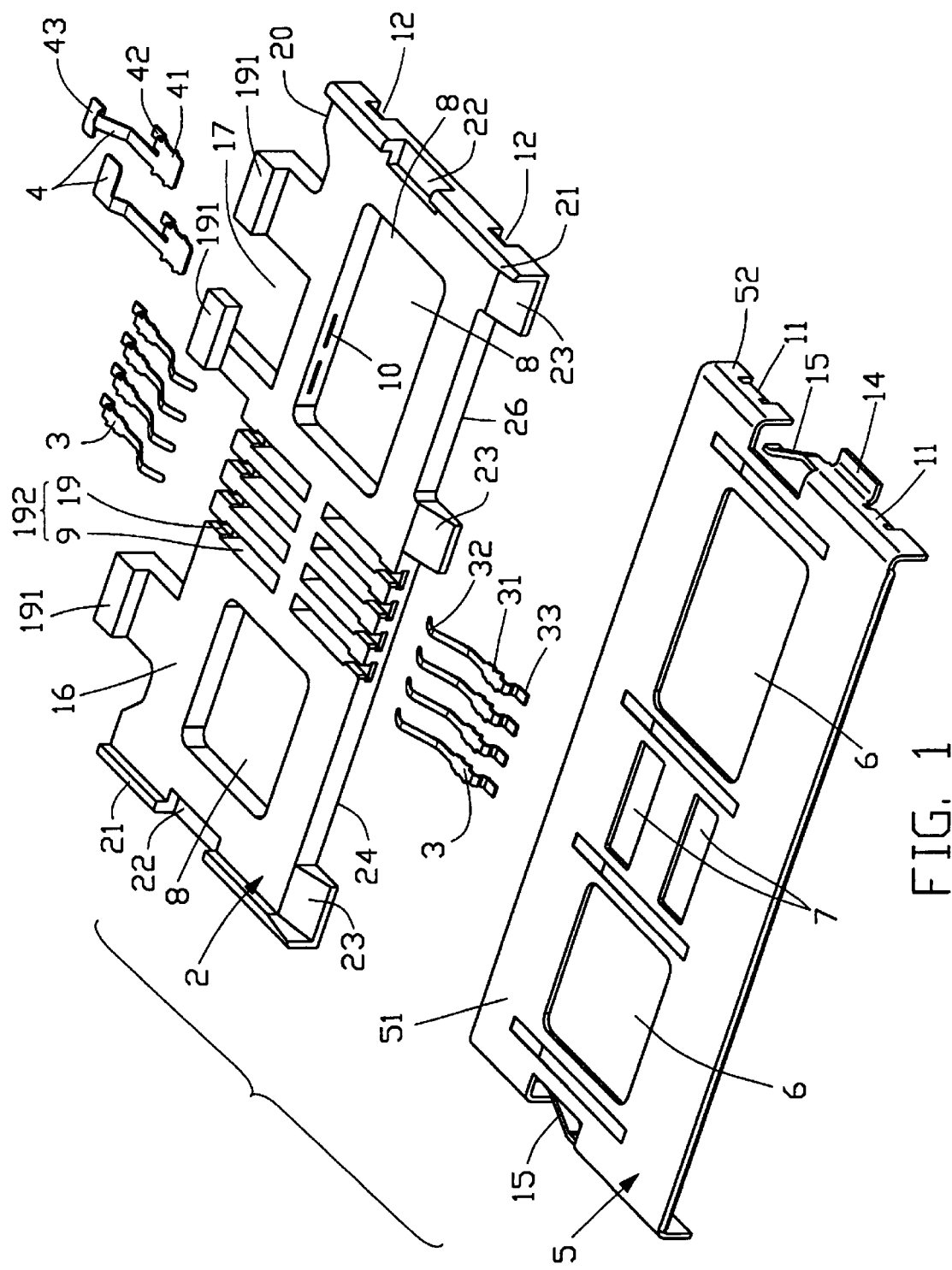
FIG. 1 is an exploded view of a smart card connector in accordance with the present invention.
Figure 2:
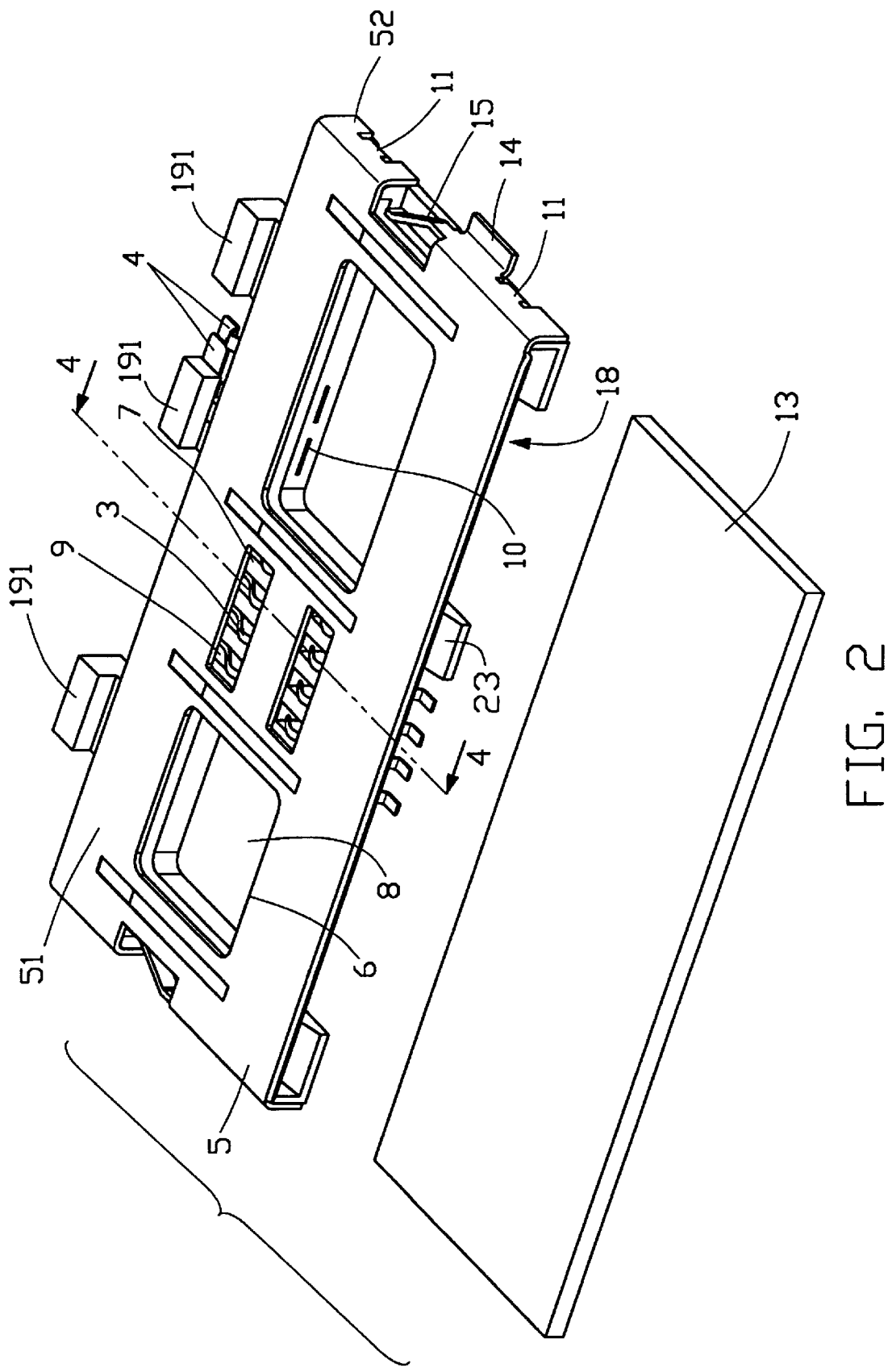
FIG. 2 is an assembled view of FIG. 1 before a smart card is inserted into the smart card connector.

Referring to FIGS. 1 and 2, a smart card connector comprises an insulative housing 2, eight signal terminals 3 in two rows, a pair of switching terminals 4 and a metal shell 5. The housing 2 defines eight slots 192 in two rows in an upper surface 16 thereof. Each slot 192 includes a cavity 9 and a securing tunnel 19 defined proximate each cavity 9 and narrower than the cavity 9. Each signal terminal 3 has a retaining portion 31, a contact portion 32 extending from one end of the retaining portion 31 and a stepped solder portion 33 extending from another end of the retaining portion 31. The retaining portion 31 of the signal terminal 3 forms locking barbs on opposite edges thereof for securing the retaining portion 31 within the securing tunnel 19. The contact portion 32 of the signal terminal 3 forms an arcuate end received in the cavity 9 extending above the upper surface 16 of the housing 2 for engaging a corresponding pad (not shown) formed on a bottom face of a smart card 13 to be inserted into the connector. In addition, the contact portions 32 of the signal terminals 3 in one row are proximate the contact portions 32 of the signal terminals 3 in the other row. The solder portion 33 of the signal terminal 3 extends out of the housing 2 for being soldered to a circuit board (not shown).

A cutout 17 is defined in a rear edge 20 of the housing 2 for receiving the switching terminals 4. Each switching terminal 4 has a retaining section 41, a planar contact section 43 extending from one end of the retaining section 41 and a stepped solder section 42 extending from the same end of the retaining section 41 and at a level lower than the contact section 43. The retaining section 41 forms locking barbs on opposite edges thereof for being interferentially fit in a corresponding retaining passageway 10 defined in the housing 2 proximate the cutout 17. The solder sections 42 of the switching terminals 4 are adapted to be soldered to the circuit board. Before the smart card 13 is inserted into the smart card connector, the contact section 43 of one switching terminal 4 engages the contact section 43 of the other switching terminal 4. When the smart card 13 is fully inserted into the smart card connector, a leading edge of the smart card 13 urges the contact section 43 of one switching terminal 4 to disengage the contact section 43 of the other switching terminal 4 thereby creating a short circuit.

A pair of guiding rails 21 upwardly extends from opposite edges of the housing 2. A groove 22 is defined in the upper surface 16 of the housing 2 near each guiding rail 21. A pair of recesses 12 is defined in the lower surface 24 of the housing 2 near each guiding rail 21. A pair of openings 8 is defined in the housing 2 between the upper surface 16 and the lower surface 24 thereby exposing portions of the circuit board for mounting other electrical components thereon. Such a method promotes an efficient use of space on the circuit board. Three projections 191 upwardly extend proximate the rear edge 20 of the housing 2 for providing a stopping wall for the inserted smart card 13. Three inclined surfaces 23 are formed on a front edge 26 of the housing 2 for facilitating insertion of the smart card 13. A pair of guiding posts 25 (FIG. 4) downwardly extends from the lower surface 24 of the housing 2 for properly positioning the smart card connector on the circuit board.

Figure 3:
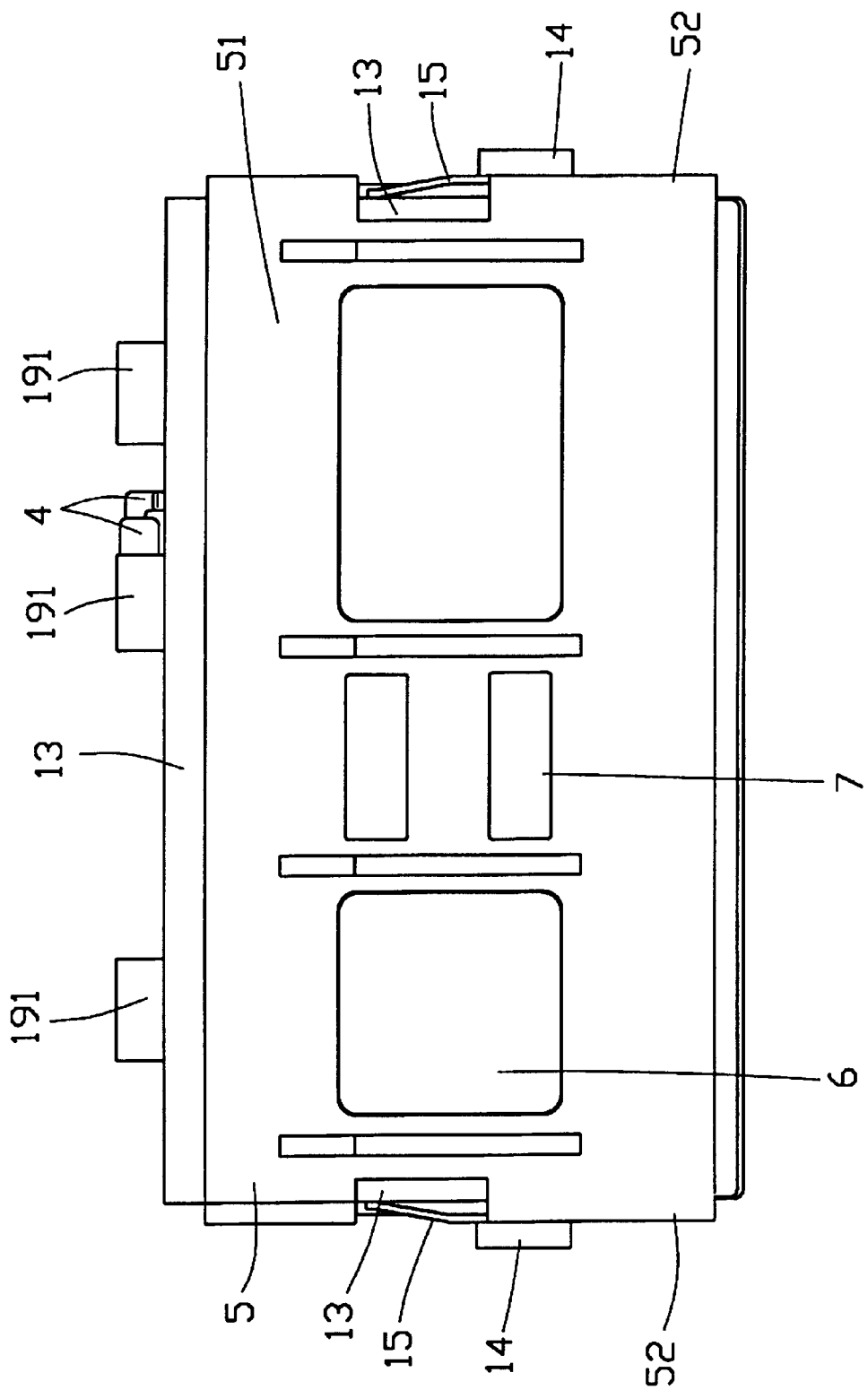
FIG. 3 is a top planar view of FIG. 2 with a smart card fully inserted into the smart card connector.

Also referring to FIG. 3, the metal shell 5 is adapted to be mounted to the upper surface 16 of the housing 2 thereby defining a receiving space 18 for receiving the smart card 13. The metal shell 5 has a planar portion 51 and a pair of side walls 52 downwardly extending from opposite edges thereof A spring arm 15 is stamped from each side wall 52 for reception in the groove 22 of the guiding rail 21 of the housing 2 for inwardly pressing against and fixing the inserted smart card 13 thereby preventing transverse movement of the smart card 13. A pair of hooks 11 is inwardly stamped from each side wall 52 of the metal shell 5 for engaging with the recesses 12 of the housing 2 thereby securing the metal shell 5 to the housing 2. A solder tab 14 is outwardly stamped from each side wall 52 of the metal shell 5 for being soldered to the circuit board thereby securing the metal shell to the circuit board.

Figure 4:
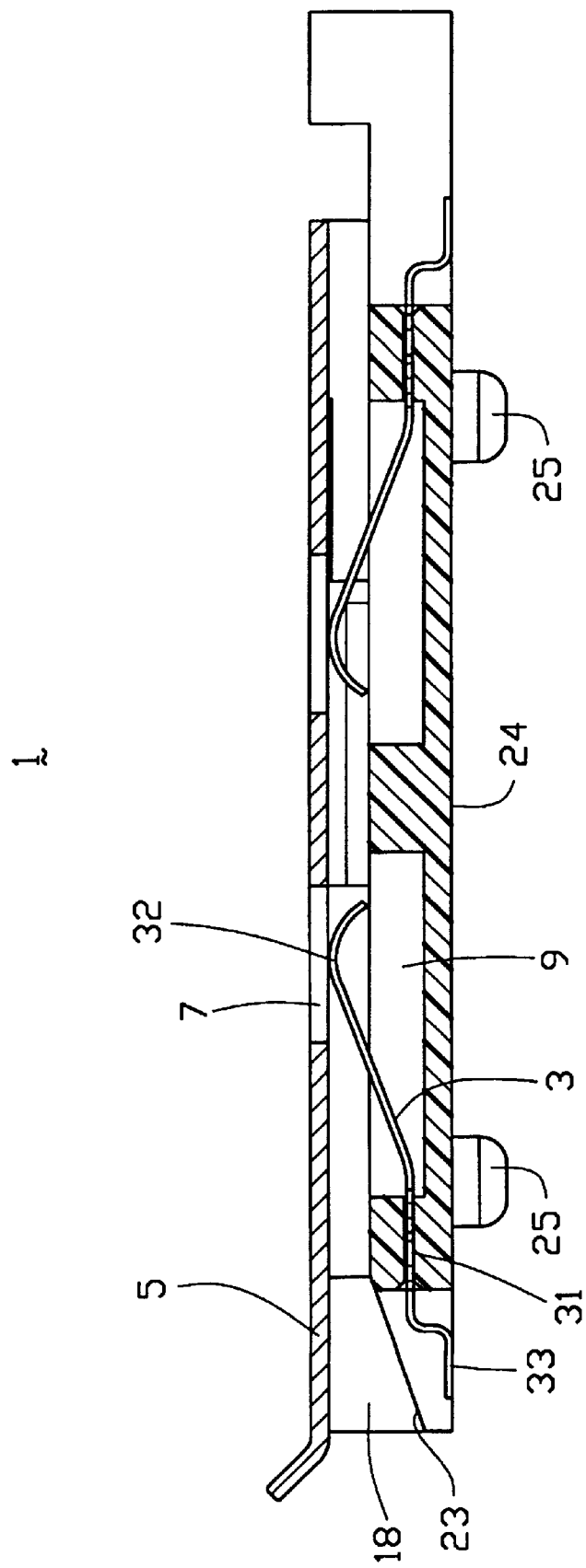
FIG. 4 is a cross sectional view taken along line 4—4 of FIG. 2.

A pair of holes 7 corresponding to the two rows of cavities 9 of the housing 2 is defined in the planar portion 51 of the metal shell 5 for exposing the contact portions 32 of the signal terminals 3 thereby preventing the contact portions 32 from touching the metal shell 5 as shown in FIG. 4. A pair of apertures 6 corresponding to the openings 8 of the housing 2 is defined in the planar portion 51 of the metal shell 5 thereby providing access to the electrical components mounted on the circuit board within the opening 8 of the housing 2.

The metal shell 5 mounted to the housing 2 is adapted to downwardly urge the smart card 13 and prevents deformation of the smart card 13 due to stress from the upwardly extending contact portions 32 of the signal terminals 3. In addition, the metal shell 5 improves the rigidity of the smart card connector having a compact dimension thereby significantly decreasing a height thereof relative to an insulative cover of the prior art.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

What is claimed is:

1. A smart card connector mounted on a circuit board for receiving a smart card, comprising:

an insulative housing defining a plurality of terminal receiving slots in an upper surface thereof;

a plurality of signal terminals accommodated in the slots, each signal terminal including a contact portion extending beyond the upper surface of the housing; and a metal shell mounted to the upper surface of the housing and having a planar portion and a pair of side walls, the planar portion defining a pair of apertures for exposing the contact portions of the signal terminals thereby preventing the contact portions of the signal terminals from touching the planar portion of the metal shell;

wherein the housing defines an opening therethrough for effective layout of other elements on the circuit board within the opening, the planar portion of the metal shell defining an aperture corresponding to the opening of the housing.

2. The smart card connector as claimed in claim 1, wherein each side wall of the metal shell has an inwardly flexing spring arm for inwardly pressing against and fixing an inserted smart card.

3. The smart card connector as claimed in claim 1, wherein each of the pair of side walls of the metal shell has at least one hook for engaging with a recess defined in the housing.

4. The smart card connector as claimed in claim 1, wherein each side wall has a solder tab for being soldered to the circuit board thereby securing the metal shell to the circuit board.

5. A smart card connector mounted on a circuit board for receiving a smart card, comprising:

an insulative housing defining a plurality of terminal receiving slots in an upper surface thereof, and at least a first opening adapted to receive therein other electrical components which are mounted on a PC board on which the connector is seated;

a plurality of signal terminals accommodated in the slots, each signal terminal including a contact portion extending beyond the upper surface of the housing; and a metal shell mounted on the upper surface of the housing and having a planar portion and a pair of side walls, the planar portion defining a second opening in alignment with the first opening for access to said electrical components within the first opening.

6. The connector as claimed in claim 5, wherein said shell further includes a third opening for exposing the contact portion.

* * * * *